2,886,471
Patented May 12, 1959

2,886,471

SOLID POLYETHYLENE PLASTIC MATERIALS

Charles Richard Bruce, Wembdon, Bridgwater, and Trevor Norman Williams, Bridgwater, England, assignors to British Cellophane Limited, Bridgwater, England, a British company No Drawing. Application March 24, 1955
Serial No. 496,622

Claims priority, application Great Britain March 30, 1954

3 Claims. (Cl. 117—138.8)

This invention is for improvements in or relating to solid polyethylene plastic materials, such as films, sheets, and manufactured articles, e.g. bottles and other vessels.

Solid polyethylene plastic materials, such as films, sheets and manufactured articles, e.g. bottles and other vessels, and methods of their manufacture, as well known. However, solid polyethylene plastic materials, as normally made, display rather poor receptivity for printing inks of the known types, and for adhesives, the print being stripped from the surface of the solid polyethylene plastic material by the "adhesive tape test," as hereinafter described.

It is an object of the present invention to improve the receptivity of surfaces of solid polyethylene plastic materials to printing inks and to adhesives.

United States patent specification No. 2,668,134 describes a process of treating polyethylene products, by oxidation of the polyethylene surfaces with a strong sulphuric acid/dichromate solution, whereby the polyethylene surfaces may readily be made hydrophilic, and adaptable to cementing and printing. The strong sulphuric acid/dichromate solution may be obtained by saturating concentrated sulphuric acid with technical sodium dichromate. The surface is prepared simply by passing the polyethylene products through a bath of the oxidising solution and then washing in water and drying. However, the employment of solutions containing sulphuric acid in a high degree of concentration for the surface treatment of solid polyethylene plastic materials introduces serious practical difficulties, for the reason that the amount of heat evolved when, in the final stages of the treatment, the adherent layer of treating agent is washed away with water, is sufficient to distort deformable solid polyethylene plastic films, sheets and manufactured articles, especially in those cases where the latter have a thickness of less than 0.01". Moreover, the use of such highly corrosive solutions in a manufacturing process is hazardous.

It has also been proposed to treat solid polyethylene plastic materials with chlorosulphonic acid, whereby a polar reaction product of polyethylene is obtained. The use of chlorosulphonic acid on a technical scale is open, however, to similar objections, but in an even more marked degree, to those set out above.

Moreover, a process for the manufacture of improved polyethylene films, which process comprises subjecting one or both surfaces of a pre-formed polyethylene film to superficial chlorination, has already been described in British patent specification No. 581,717. The superficially chlorinated polyethylene films are stated to be readily dyed and printed by known methods. Superficial chlorination of polyethylene films presents difficulties, however, owing to the poisonous and corrosive nature of the gaseous chlorine employed.

Thus, although these earlier procedures represent a considerable advance, there is still room for improvement. We have now found that by the treatment of the surfaces of solid polyethylene plastic materials with aqueous solutions free from sulphuric acid and containing at least 35% by weight of chromium trioxide, the surfaces display, after washing with water and drying, enhanced bonding to printing inks, such that the printed surface will resist the "adhesive tape test" referred to above. The preferred printing inks for application to the treated surfaces of the solid polyethylene plastic material are those suitable for use on smooth surfaces of other non-fibrous organic materials, such as regenerated cellulose films of the plain and moistureproof types. Such inks dry mainly by evaporation of solvents, and such inks prepared with an alcohol or ketone solvent are preferred. Improved bonding strength is shown also by laminates made from the treated film either by heat-sealing or by the use of adhesives. Solid polyethylene plastic film, treated on one side only, is also very suitable for the manufacture of adhesive tape.

Accordingly, the present invention provides a process of treating deformable solid polyethylene plastic materials, which process comprises treating the surface of the solid polyethylene plastic material with an aqueous solution free from sulphuric acid and containing at least 35% by weight of chromium trioxide, washing the treated material with water, and drying.

The employment, in the process of the invention, of an aqueous solution containing chromium trioxide in the proportion stated, obviates the difficulties hereinabove set forth, since as regards aqueous solutions containing at least 35% by weight of chromium trioxide, the heat of dilution is relatively small, and although these solutions give rise to staining in contact with the skin, burns do not develop and the stains are easily removable.

In carrying out the process of the present invention, the surface of the solid polyethylene plastic material may be treated with the aqueous solution containing at least 35% by weight of chromium trioxide simply by passing the material through a bath of the solution, and then thoroughly washing the surface of the material with water, and drying. The duration of the treatment depends upon the concentration, purity, and temperature of the aqueous solution containing chromium trioxide with which the surface of the solid polyethylene plastic material is being treated, and may easily be determined, for any given case, by a few trials.

Treatment of the surface of the solid polyethylene plastic sheet and film is preferably carried out in a continuous manner.

By raising the temperature of the treating bath, the duration of the treatment may be shortened. If, for example, an aqueous solution of chromium trioxide, saturated at 20° C., is heated to 85° C., the speed of treatment can be trebled; if the aqueous solution of chromium trioxide is saturated at the temperature of 85° C., the speed of treatment can be increased fifteen-fold, compared with the speed of treatment obtainable by using a solution saturated at 20° C.

The efficacy of the treating bath is dependent on the concentration of the chromium trioxide. Thus, the solution should preferably contain at least 50% (by weight) of chromium trioxide at 20° C., and at least 40% (by weight) of chromium trioxide at 85° C.

The molecular weight of the solid polyethylene plastic employed is not critical. Good results may be obtained by surface treatment of solid polyethylene plastic of number average molecular weight ranging from 14,000 to 44,000.

Pre-formed film of solid polyethylene plastic, which may be in the form of e.g. sheet or tube, is generally between 0.001" and 0.050", and preferably between 0.001" and 0.005", in thickness.

The solid polyethylene plastic of which the film is formed may be, for example, commercial polyethylene having a number average molecular weight of 28,000, or a commercial plastic compound comprising solid polyethylene plasticised with a known plasticiser such as raw rubber, hydrogenated rubber, or polyisobutylene, and may contain slip-agents, pigments, and anti-oxidants, and other substances such as are commonly added in the trade. It has been found that anti-oxidants of the types normally used with solid polyethylene plastic materials, do not interfere, when present in their normal amounts, with the operation of the process of the present invention.

In the present specification, parts and proportions are parts and proportions by weight, unless otherwise stated.

Following is a description, by way of illustration, of methods of carrying the invention into effect.

*Example I*

A film of solid commercial polythene (number average molecular weight 28,000), 3¼ inches wide and 0.002 inch thick, was unwound from a roll and passed through a bath constituted by a saturated solution of chromium trioxide in water, free from sulphuric acid, at a temperature of 20° C. The length of film immersed in the bath was 13″. The film rising from the treatment bath was passed through scrapers to reduce the carry-over of the solution of chromium trioxide, and was then passed through a bath of washing water. The treated film was wetted on the surface by the washing water. The water left on the film was removed by passing the film between rubber rollers under light pressure to constitute a mangle. The treated film was finally dried by gentle heat, and rewound. Film that had been treated at a speed of 16 ft./minute was printed with "Winstone Blue AE–1576" ink on a rotary gravure printing machine. The printed surface, when dry, resisted the "adhesive tape test" hereinafter described. By way of control, it may be mentioned that when untreated polythene film was printed in the same manner, the print was stripped completely by the adhesive tape in this test.

*Example II*

A rack supporting 144 standard 4 oz. blown polythene bottles was placed over a bath containing an aqueous solution free from sulphuric acid and saturated with chromium trioxide at 40° C., the temperature of the solution of the bath also being 40° C. The rack was then lowered so that each bottle was immersed in the solution of the bath up to the shoulder. The bottles were immersed for a period of 5 seconds, and were then removed and placed in a bath of running cold water (15° C.) until all traces of chromium had been removed. The bottles were then allowed to dry, and were then printed by means of a simple roller with a thin film of Colora Omnilux Red CA/8090. After drying, the printed surface successfully withstood the "adhesive tape test" hereinafter described.

It may be mentioned that other bottles which were printed by way of control without previous immersion in the bath containing an aqueous solution of chromium trioxide, washing with water, and drying, showed no resistance to the adhesive tape test, the ink layer being completely removed.

The adhesive tape test is carried out in the following way:

The solid polyethylene plastic material, which may for example be in the form of a film, is printed in the machine to be employed, in the contemplated large scale printing operations, with the particular printing ink to be employed, so as to leave on the surface of the film a printed layer of approximately 0.0001″, and normally not exceeding 0.0002″, in thickness, and the applied printing ink is allowed to dry under conditions similar to those in the contemplated large-scale printing operations. A length of the dried printed film is laid on a flat sheet of glass, and a strip of cellulose adhesive tape (of the kind hereinafter described( ½″ in width, is applied to the printed surface of the film, with its adhesive surface in contact with the printed surface of the film, and is pressed into contact by rolling thereover a brass roller, 1″ in diameter and ¾″ in width, weighted to 600 grams. The tape is then stripped by a steady pull, by hand, at the rate of 2½″ per second. If the print applied to the film is substantially unaffected by the application and subsequent stripping of the cellulose adhesive tape, the printed surface is characterised as having "resisted" the adhesive tape test. On the other hand, if the print applied to the film is substantially affected (e.g. in many cases substantially completely removed) by the application and subsequent stripping of the cellulose adhesive tape, the printed surface is characterised as not having "resisted" the adhesive tape test.

Cellulose adhesive tape, of the kind suitable for employment in this test, has a stripping load from a smooth untreated solid polyethylene film surface, when applied to the surface of the film with its adhesive surface in contact with the surface of the film, and pressed into contact with the surface of the film by rolling thereover a brass roller, 1″ in diameter and ¾″ in width, weighted to 600 grams, of between 70 grams and 150 grams for the ½″ wide tape, when measured with a Suter tensile testing machine with the jaws separating at the steady rate of 13½″ per minute.

We claim:

1. A process for treating heat-deformable solid polyethylene plastic materials to render the surface of the material receptive to printing inks and adhesives without deformation of the material, which process comprises treating the surface of the heat-deformable solid polyethylene plastic material with a solution consisting essentially of water, containing chromium trioxide dissolved therein in the range of 35% by weight to saturation, followed by washing the treated material with water and drying.

2. A process as claimed in claim 1 in which the solution of water containing chromium trioxide is at a temperature of substantially 20° C. and the amount of chromium trioxide dissolved therein is in the range of 50% by weight to saturation.

3. A process as claimed in claim 1 in which the solution of water containing chromium trioxide is at a temperature of substantially 85° C. and the amount of chromium trioxide dissolved therein is in the range of 40% by weight to saturation.

References Cited in the file of this patent

UNITED STATES PATENTS 2,668,134   Horton _____ Feb. 2, 1954

OTHER REFERENCES

Prescott et al.: Qual. Chem. Analysis, 6th ed., 1911, D. Van Nostrand Co., N.Y.C., page 147, paragraph 5, sentence 1.